n-PORT MONOLITHIC THIN FILM DISTRIBUTED RESISTANCE NETWORK

Filed May 8, 1967 5 Sheets-Sheet 1

INVENTORS R. J. DOW
D. FELDMAN
S. C. LEE
E. S. MITCHELL, JR.
R. W. WYNDRUM, JR.
BY E. J. Olinder
ATTORNEY n-PORT MONOLITHIC THIN FILM DISTRIBUTED RESISTANCE NETWORK
Filed May 8, 1967 5 Sheets-Sheet 4
FIG. 6A
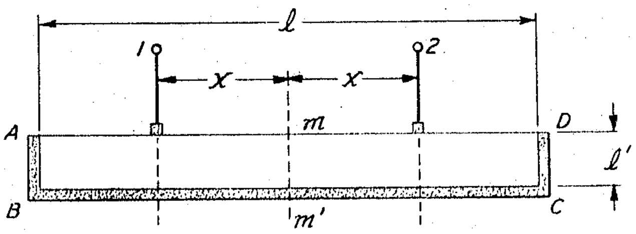
FIG. 6B
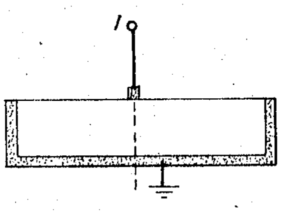
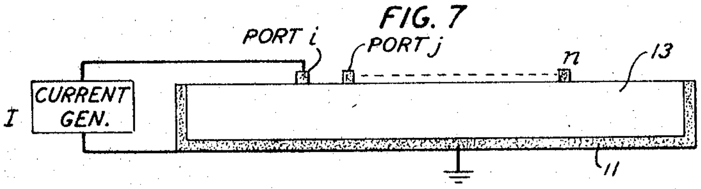
FIG. 7
FIG. 8
[Z] =
| | | | | | | | | |
|---|---|---|---|---|---|---|---|---|
| 75.4 | 37.7 | 18.85 | 9.425 | 4.71 | 2.356 | 1.178 | 0.569 | 0.2845 |
| 37.7 | 75.4 | X | X | X | X | X | X | X |
| 18.85 | X | 75.4 | X | X | X | X | X | X |
| 9.425 | X | X | 75.4 | X | X | X | X | X |
| 4.71 | X | X | X | 75.4 | X | X | X | X |
| 2.356 | X | X | X | X | 75.4 | X | X | X |
| 1.178 | X | X | X | X | X | 75.4 | X | X |
| 0.569 | X | X | X | X | X | X | 75.4 | X |
| 0.2845 | X | X | X | X | X | X | X | 75.4 |
(UNITS IN OHMS)
FIG. 9
[Z] =
| | | | | | | | | |
|---|---|---|---|---|---|---|---|---|
| 1.193 | 0.5965 | 0.29825 | 0.19912 | 0.09956 | 0.04978 | 0.02489 | 0.012445 | 0.00622 |
| 0.5965 | 1.193 | X | X | X | X | X | X | X |
| 0.29825 | X | 1.193 | X | X | X | X | X | X |
| 0.19912 | X | X | 1.193 | X | X | X | X | X |
| 0.09956 | X | X | X | 1.193 | X | X | X | X |
| 0.04978 | X | X | X | X | 1.193 | X | X | X |
| 0.02489 | X | X | X | X | X | 1.193 | X | X |
| 0.012445 | X | X | X | X | X | X | 1.193 | X |
| 0.00622 | X | X | X | X | X | X | X | 1.193 |
(UNITS IN OHMS)

3,460,026
n-PORT MONOLITHIC THIN FILM DISTRIBUTED RESISTANCE NETWORK

Robert J. Dow, Amesbury, Mass., and David Feldman, Springfield, Samuel C. Lee, New Providence, Edward S. Mitchell, Jr., Succasunna, and Ralph W. Wyndrum, Jr., New Providence, N.J., assignors to Bell Telephone Laboratories, Incorporated, Murray Hill, and Berkeley Heights, N.J., a corporation of New York Filed May 8, 1967, Ser. No. 649,761
Int. Cl. H01c 7/00
U.S. Cl. 323—74 15 Claims

ABSTRACT OF THE DISCLOSURE

*n*-Port, thin film, distributed resistance networks are formed from rectangular or circular thin film areas deposited on supporting substrates. Desired network functions are realized by connecting suitably proportioned conductive tabs or ports and conductive grounding strips to specified portions of the resistive film.

BACKGROUND OF THE INVENTION

Field of the invention

This is a continuation-in-part of our copending application, Ser. No. 602,239, filed Dec. 16, 1966, now abandoned, and relates to *n*-port distributed resistance area attenuators and more particularly to thin film attenuators of this type.

Description of the prior art

The problem of analyzing two dimensional current flow, as for example current flowing across a rectangular plate having electrodes on opposite sides thereof has intrigued both theoreticians and laboratory experimenters for more than a half century. Early work in this area is illustrated by H. Fletcher Moulton's paper "Current Flow in Rectangular Conductors" published in the Proceedings of the London Mathematical Society, Jan. 12, 1905. Moulton's work was directed primarily toward a determination of the effect of electrode size and placement in a few specific combinations.

Until recently, two dimensional current flow has been a matter of academic interest only. With the advent of integrated circuitry, however, particularly that portion of the art relating to thin films and the utilization of distributed resistance in lieu of lumped elements, an acute need has arisen for increased knowledge as to what correlation can be established between various lumped resistance networks and thin film distributed resistance networks. In the absence of such knowledge it seems likely that the full potential of broad applications of thin film distributed, or area, resistances will not be realized.

Thus far it is known that simple three and four terminal lumped resistive attenuators characterized by two driving point impedances and a single transfer impedance, or insertion loss, can readily be replaced by fully equivalent distributed resistance networks. Problems presented in the design of distributed resistance networks equivalent to more complex lumped element networks, however, such as multiport ladder networks for example, have heretofore remained unsolved.

SUMMARY OF THE INVENTION

Accordingly, a broad object of the invention is to enhance the utility of distributed resistance networks.

The principles of the invention are based in part upon the realization that for any lumped resistance *n*-port ladder network with constant input impedance at each port there always exists a tapped distributed resistance network equivalent such that the open-circuited impedance transfer functions of any one port with respect to a reference port in one network is the same as the corresponding impedance in the other.

In one illustrative embodiment of the invention an n-port, thin film, distributed resistance network is utilized as the digital-to-analog decoder network for a pulse code modulation (PCM) receiver. The conventional lumped resistance ladder network replaced thereby requires a total of 17 interconnected resistors to effect digital-to-analog translation for a 9 bit code. Avoiding the employment of individual circuit elements in accordance with the invention in such a case ensures increased reliability and a reduction in both size and cost.

A specific feature of a distributed network in accordance with the invention involves the utilization of a thin film resistive surface of a specified rectangular configuration with means for maintaining a first side and at least a substantial portion of both ends thereof at a reference potential, such as ground potential for example. The ports of the network are in the form of terminals or tabs affixed along the second side of the film structure.

The location of the tabs is established in accordance with the specific network function desired. Another feature of the invention relates to a restriction on the precise portion of the terminal side of the network to be utilized for the connection of terminal tabs in order to ensure substantially uniform impedance between each terminal tab and ground.

An additional feature pertains to a particular range of terminal tab sizes that ensures the most advantageous compromise between a theoretically desirable point tab and a physically realizable tab without adversely affecting the designed network functions.

A further feature of the invention relates to a distributed resistance network employing a thin film resistive surface of a substantially circular configuration. The features of the invention relating to terminal placement and terminal size requirements, indicated above with respect to rectangular distributed resistance networks are equally applicable to the circular network. This equivalency between rectangular and circular networks in accordance with the invention derives from the fact that a circular network may be viewed as being formed by a suitably proportioned rectangular area with the ends thereof being pivoted around until they meet. When the then open center portion is filled in with resistive material except for a grounded conductive spot in the center thereof, the resulting structure is found to be substantially the electrical equivalent of the corresponding rectangular network.

BRIEF DESCRIPTION OF THE DRAWING

FIG. 6A is a network in accordance with the invention with tabs located at the (¼)*l* and (¾)*l* points;

FIG. 6B is a network of the general form shown in FIG. 6A having half the length thereof and a single terminal tab at the center position;

FIG. 7 is a sketch of a network in accordance with the invention with a current source I connected between a port *i* and ground;

FIG. 8 is the Z-matrix of the circuit shown in FIG. 3;

FIG. 9 is the normalized form of the Z-matrix shown in FIG. 8; and

DETAILED DESCRIPTION

In the prior art it is known that necessary and sufficient conditions for the realization of a resistance *n*-port impedance matrix with a specific port structure may be derived and further that these conditions may be synthesized in terms of a lumped resistance network. See for example the text, "Topological Analysis and Synthesis of Communication Networks" by W. H. Kim and R. T. Chien, Columbia University Press, New York, 1962, pp. 133–198. In many practical problems it is often found that only a part of an *n*-port matrix is specified, and the rest is unspecified or may be arbitrary. In such problems, the complexity of the synthesis of an *n*-port matrix is considerably reduced as compared to a case in which all entries are specified.

The investigations that resulted in the formulation of the principles of the instant invention were directed toward determining whether a monolithic or distributed resistance network, $\overline{R}$, realization, as opposed to a lumped resistance network, could be obtained for a class of *n*-port matrices with only the driving-point functions and the transfer functions being specified with respect to particular ports.

The conventional conditions placed on the [Z] matrix for a class of *n*-port impedance matrices may be expressed in the following conventional matrix form:

$$\begin{bmatrix} V_1 \\ V_2 \\ \cdot \\ \cdot \\ \cdot \\ V_r \\ \cdot \\ \cdot \\ \cdot \\ V_n \end{bmatrix} = \begin{bmatrix} z_{11} & z_{12} \cdots z_{1r} \cdots z_{1n} \\ z_{21} & z_{22} \cdots z_{2r} \cdots z_{2n} \\ \cdot & \cdot \quad \cdot \quad \cdot \\ \cdot & \cdot \quad \cdot \quad \cdot \\ \cdot & \cdot \quad \cdot \quad \cdot \\ z_{r1} & z_{r2} \cdots z_{rr} \cdots z_{rn} \\ \cdot & \cdot \quad \cdot \quad \cdot \\ \cdot & \cdot \quad \cdot \quad \cdot \\ \cdot & \cdot \quad \cdot \quad \cdot \\ z_{n1} & z_{n2} \cdots z_{nr} \cdots z_{nn} \end{bmatrix} \begin{bmatrix} I_1 \\ I_2 \\ \cdot \\ \cdot \\ \cdot \\ I_r \\ \cdot \\ \cdot \\ \cdot \\ I_n \end{bmatrix} \quad (1)$$

or $[V]=[Z][I]$, where $z_{ij}$ is a designated impedance. Where *i* and *j* designate specific nodes, where all $z_{ij}$, the open-circuited impedance transfer function from port *i* to port *j*, are real numbers, where $z_{ij}=z_{ji}$ for all *i* and *j*; and where $z_{ii}>0$ for all *i*, $z_{ii}$ being the impedance between any tab *i* and ground, [Z] satisfies the following conditions:

(1) $z_{ii}$=constant, for all *i*. (Impedances from any node to ground are equal.)

(2) $z_{ij}>0$ for $i, j=1, 2, \ldots, n$, but $z_{ij}\neq z_{ik}$, for $j\neq k\neq i$. (All common ground resistive networks meet this condition.)

(3) There exists a reference port *r* such that $z_{ii}>z_{ir}$ for all *i*. (The structure acts as an attenuator; i.e., all transmittances between nodes suffer loss.)

(4) $z_{ij}$ may be arbitrary, for $i\neq j$ and $i, j\neq r$ (i.e., transmissions not involving the reference node are unspecified).

Figure 1:
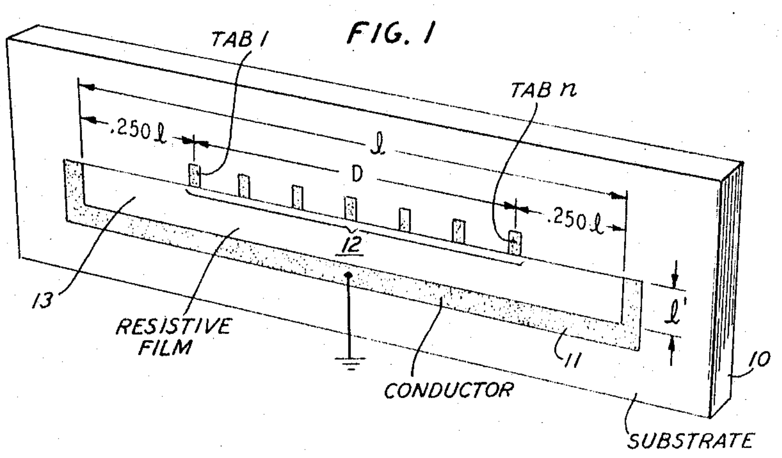
FIG. 1 is a sketch in perspective of a distributed resistance network in accordance with the invention.

The essence of the invention lies in the physical structure of an *n*-port, thin film, monolithic, distributed resistance, $\overline{R}$, tapped network of the general form illustrated in FIG. 1 which meets all of the network conditions stated above. To form the structure shown in FIG. 1, a thin resistive film 13, which may have a thickness on the order of 600 angstroms for example, is deposited on a substrate 10 which may be constructed of glass, ceramic or other suitable non-conducting material. Techniques for depositing resistive films, comprising tantalum and compounds thereof for example, are well known in the art as shown, for example, by D. A. McLean in Patent 3,154,556 issued Dec. 1, 1964. The resistive film 13 is rectangular in form with a relatively high ratio of length *l* to width *l'*, such as 12:1, for example. A plurality of terminals or tabs 1 through *n* are suitably affixed within the interval D along one side of the resistive film 13. The interval D is selected, in accordance with the principles of the invention, to correspond with the center one-half of the length *l*. Stated otherwise, the terminal tabs 1 and *n* are each located at a distance (¼)*l* from the respective ends of the rectangular film 13. The significance of the selection of the interval D is explained in detail hereinbelow. Further, in accordance with the invention, a thin layer of conductive material 11, which may be a copper-nickel-palladium alloy, for example, is deposited along the non-tab side and across both ends of the resistive film 13. As indicated, the conductive film 11 is maintained at a reference potential, such as ground for example. In effect, three of the four sides of the rectangular uniform resistance sheet 13 are short circuited by a theoretically perfect conductor that is formed by the film 11.

In accordance with the invention, all of the terminals or tabs 1 through *n* are identical and relatively small compared with the length *l*. Tabs of negligible width would be ideal but it has been found, in accordance with the invention, that tab sizes within the range of .01*l* to .001*l* offer a suitable compromise between the theoretically ideal size and tab size of ideal physical realizability.

Figure 2A:
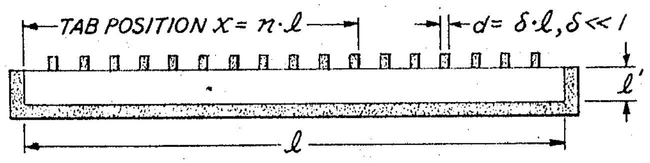
FIG. 2A is a plan view of a network in accordance with the invention.

In accordance with the invention it can be shown on the basis of both theoretical analysis and physical measurement that a network of the form shown in FIG. 1 has certain unique properties that make it possible to realize an *n*-port thin film distributed resistance, $\overline{R}$, network that is the full equivalent of a particular class of lumped multiterminal networks. In considering the network shown in FIG. 1, and its more general form shown in FIG. 2A, specifically considering the driving point resistances from the terminals to ground, it has been found that the resistances to ground from two tabs of the same size placed at any two positions within the interval D are substantially equal. Further, for a given tab size, the tab locations at which the resistance to ground is maximum is at the center of the length *l*. This resistance value decreases monotonically as the tab is moved from the center toward the quarter length position ((¼)*l*) and the resistance is minimum when the tab is at the quarter length point in the interval D. Additionally, the ratio of the maximum and minimum resistances between any tabs and ground is substantially independent of tab width so long as tab width is kept relatively small in relation to the length *l* of the deposited rectangular resistive film.

The disclosure of the invention as set forth above, supplemented by a brief additional discussion of the terminal spacing that is required to duplicate network functions realized in corresponding lumped resistance networks, is sufficient to teach the practice of the invention in specific and limited embodiments. A more complete analysis of the principles and features of the invention from the viewpoint of conventional impedance network theory is required, however, for a fuller understanding of the broader aspects of the invention. Accordingly, such an analysis is presented below and serves, in part, as a preface to a detailed description of the nature of the spacing between adjacent tabs that is employed, in accordance with the principles of the invention, in order to duplicate the network functions of a specific corresponding conventional lumped resistance network.

Figure 2B:
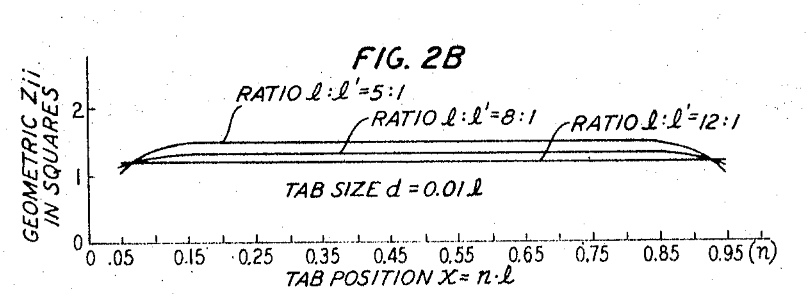
FIG. 2B is a plot of the impedance between a terminal tab and ground vs. tab position for various network length-to-width ratios, with reference to FIG. 2A.
Figure 2C:
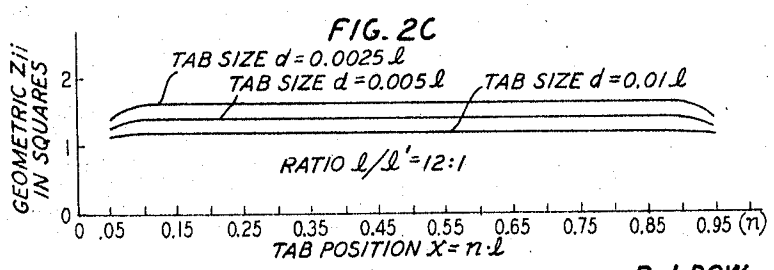
FIG. 2C is a plot of the impedance between a terminal tab and ground vs. tab position for various tab sizes with reference to FIG. 2A.
Figure 2D:
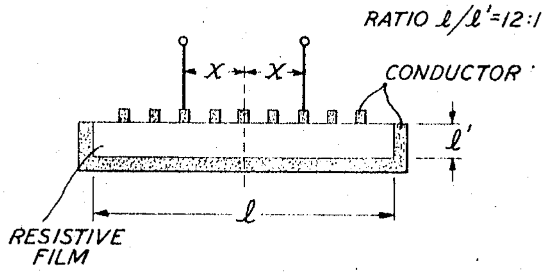
FIG. 2D is a plan view of the network in accordance with the invention.
Figure 2E:
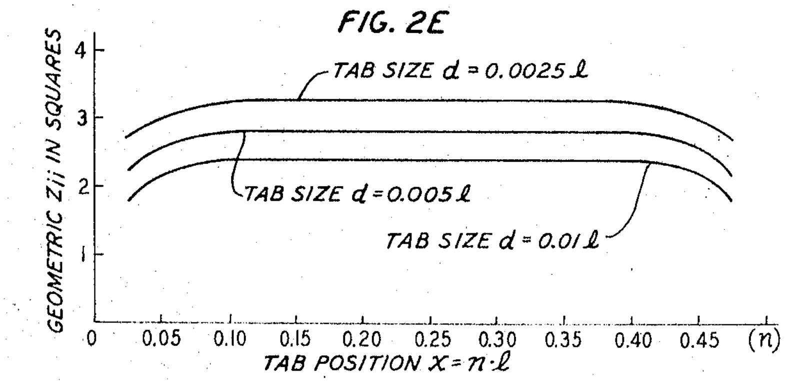
FIG. 2E is a plot of impedance between symmetrically placed pairs of tabs vs. the distance between such pairs for various tab sizes with reference to the structure shown in FIG. 2D.

The relations among the key circuit and physical parameters of a monolithic network in accordance with the invention are illustrated by the sets of curves shown in FIGS. 2B, 2C and 2E. FIGS. 2B and 2C are drawn with reference to the network shown in FIG. 2A, and the curves of FIG. 2E are drawn with reference to the network shown in FIG. 2D. Plots of $z_{ii}$ vs. tab position for circuits with ratios $l/l'$ of 5, 8 and 12 for a fixed tab size of $0.01l$ are shown in FIG. 2B. A tabulation of the input impedance between the center tab and ground, $z_{ii\,max}$, and the input impedance between a tab at ¼$l$ and ground, $z_{ii\,min}$, for different ratios of $l/l'$ is presented in the following table:

(2)

| Tab Size=0.01$l$ | | | |
|---|---|---|---|
| Ratio $l/l'$ | $z_{ii\,max}$ (squares) | $z_{ii\,min}$ (squares) | $z_{ii\,max}/z_{ii\,min}$ |
| 5 | 1.4713 | 1.4602 | 1.0076 |
| 8 | 1.3220 | 1.3210 | 1.000757 |
| 12 | 1.1933 | 1.1932 | 1.000084 |

The above tabulation indicates that $z_{ii\,max}/z_{ii\,min}$ approaches unity as the ratio $l/l'$ increases.

Verification for the conclusion that $z_{ii\,max}/z_{ii\,min}$ is substantially invariant with tab position for different tab sizes is presented by FIG. 2C which shows the plots of $z_{ii}$ vs. tab position for three different tab sizes with a fixed $l/l'$ ratio of 12. The ratio $z_{ii\,max}/z_{ii\,min}$ for the three tab sizes is listed in the following table:

(3)

| Ratio $l/l'$=12 | | | |
|---|---|---|---|
| Tab Size | $z_{ii\,max}$ (squares) | $z_{ii\,min}$ (squares) | $z_{ii\,max}/z_{ii\,min}$ |
| 0.01$l$ | 1.193357 | 1.193299 | 1.0000846 |
| 0.005$l$ | 1.413757 | 1.41370 | 1.0000403 |
| 0.0025$l$ | 1.634330 | 1.634325 | 1.0000030 |

This tabulation also shows that $z_{ii\,max}/z_{ii\,min}$ approaches unity as the tab size decreases.

For a given tab size the resistance between two tabs which are symmetrically placed with respect to the center line at the (¼)$l$ points is maximum. The proof of this relation may readily be established as follows: In the structure shown in FIG. 6A tabs 1 and 2 are symmetrically placed and the center position $m-m'$ is an equipotential surface. Thus, a perfect conductor can be inserted along the center line $m-m'$ to the reference potential conductor ABCD without disturbing the electric field and current flow in the network. After the insertion of such a perfect conductor, it is found that the resistance between tabs 1 and 2 in FIG. 6A is equal to twice the resistance between tab 1 and the ground connection in FIG. 6B. If the distance $x$ in FIG. 6A is $l/4$, this last indicated resistance is maximum. Further, it necessarily follows that the resistance between the tabs 1 and 2 positioned in the manner shown in FIG. 6A is maximum. Impedance measurements of a circuit of the form shown in FIG. 6A confirm this conclusion.

As indicated above, the choice of the interval D shown in FIG. 1 is critical because of the unique impedance properties of terminals placed at the (¼)$l$ points. Additional insight into the advantages that dictate the selection of the interval D for the placement of terminal tabs may be gained from a consideration of the range of possible transfer functions made available thereby. Stated broadly, the interval D is selected to ensure that the input impedance between the two tabs at the ends of the interval is a maximum and decreases monotonically as the tabs are moved closer together. The tabs placed at the ends of the interval D thus correspond to the minimum transfer function or maximum insertion loss. Because the tab to ground impedances are essentially equal for all tabs in the interval D and because the tab-to-tab impedances monotonically *decrease* as the tabs are moved closer together in the interval D, the transfer impedances will monotonically *increase* between tabs as the tabs are moved closer together. This maximum transfer function thus corresponds to the closest tab locations. In typical practical network applications such as attenuators and resistive decoder networks, obtaining the minimum transfer impedance ensures the achievement of all larger transfer functions.

Additional significance in the selection of the interval D in accordance with the invention arises from the requirement that the values $z_{ii\,max}$ and $z_{ii\,min}$ be as close as possible if practical network functions are to be realized. It may be shown that if tab locations are restricted to the interval D in accordance with the invention, these values may be arbitrarily close to each other.

It is important to note that an $n$-port Z-matrix of a monolithic tapped resistance network of the form shown in FIG. 1 does in fact meet all of the four conditions stated following the matrix expression (1). With reference to FIG. 7, assume that $n$-tabs provide $n$-ports with the ground conductor 11 as the common terminal. Let $z_{ij}$ be the open-circuited impedance transfer function from port $i$ to port $j$. Since all ports have a common ground, $z_{ij}>0$, if a current source I is connected to port $i$, as shown, and $V_i$ and $V_j$ are the voltages to ground measured at ports $i$ and $j$ such that $V_i>V_j$, then $$z_{ii}\equiv\frac{V_i}{I}>\frac{V_j}{I}\equiv z_{ij} \qquad (4)$$

The four conditions stated above following the [Z] matrix (1) are thus met. Moreover, these conditions are the same as realized by a conventional lumped resistance $n$-port ladder network of the form shown in FIG. 3 with a constant input impedance at each of the ports 30 through 38.

As indicated above, one of the aspects of the invention deals with the effect of tab size (or tab width) on other circuit parameters. Specifically, it has been found that for a tapped monolithic resistance network with $l/l'\gg1$, the ratio $Z_{ii\,max}/z_{ii\,min}$ is substantially constant for any tab size, provided that the tab size $d$ is small compared to the length $l$, for example, $d\leq0.01l$. Support for this conclusion is demonstrated by FIG. 2E which shows plots of $Z_{ii}$ vs. tab position for tab sizes .01$l$, .005$l$ and .0025$l$ with the ratio $l/l'=12$. A corresponding tabulation of the ratio $Z_{ii\,max}/z_{ii\,min}$ is set forth in the following table:

(5)

| Ratio $l/l'$=12 | | | |
|---|---|---|---|
| Tab Size | $Z_{ii\,max}$ (squares) | $z_{ii\,min}$ (squares) | $Z_{ii\,max}/z_{ii\,min}$ |
| 0.01$l$ | 2.3864 | 1.1933 | 1.9998324 |
| 0.005$l$ | 2.82730 | 1.4138 | 1.9998432 |
| 0.0025$l$ | 3.2684 | 1.6343 | 1.9998470 |

In the foregoing discussion it has been shown that the *necessary* conditions for an $n$-port Z-matrix to be realizable as an $n$-tab distributed $\overline{R}$ network are that the Z-matrix (1) satisfies the four conditions indicated. It can also be demonstrated that these requirements provide

*sufficient* conditions on [Z] and accordingly a synthesis procedure may be followed to derive a tapped distributed $\overline{R}$ network that is functionally equivalent to a specific lumped resistance network. It can thus be concluded as one of the principles of the invention that for any lumped resistance $n$-port ladder network with constant input impedance at each port, such as the ladder network shown in FIG. 3 for example, there always exists a tapped distributed $\overline{R}$ network equivalent circuit such that the open-circuited impedance transfer functions of any one port $j$ with respect to a reference port $r$ of the two networks are the same.

The specific steps to follow in a synthesis procedure in accordance with the invention for realizing an $n$-port [Z] matrix as a tapped $\overline{R}$ network may be summarized as follows:

(1) Test the four realizability conditions listed following the [Z] matrix (1), above.

(2) Determine the ratio $r=l/l'$ as follows:

(a) Choose a reasonably small tab size $d$, for example $0.01l \geq d \geq 0.001l$. Assume that the maximum allowable tolerance on $z_{ii}$ is specified and let E be equal to the tolerance where $E=(z_{ii\,max}-z_{ii\,min})/z_{ii\,min}$. It is obvious that a determinable relation exists between the ratio $r=l/l'$ and the error E, i.e., as $r$ increases $E$ decreases. By the use of an experimental curve of this function or by straightforward iteration determine a first specific ratio $r=l/l'$ that corresponds to the error E and designate that ratio $M_1$.

(b) Find the minimum value of the transfer function $z_{ir}$, $i=1, 2, \ldots r-1, r+2, \ldots n$ and denote that value by $z_{ri\,min}$. Where $$\sigma=z_{ii\,min}-(\tfrac{1}{2})Z_{ii\,max} \text{ (units in squares)}=z_{ri\,min}$$

find a second specific ratio $r=l/l'$ that corresponds to $\sigma$ and designate that ratio $M_2$.

(c) Choose a ratio $M \geq \max.(M_1, M_2)$ in order to meet the most stringent conditions.

(3) Determine the required resistivity $\rho$ of the resistive film by first determining the $z_{ii\,min}$ corresponding to the ratio M and tab size $d$ employing the relation $\rho=z_{ii}$ of the specification/$z_{ii\,min}$.

(4) Find the normalized Z-matrix, denoted by $[\bar{Z}]$ $$[\bar{Z}]=\frac{1}{\rho}\begin{bmatrix} z_{11} & z_{12} \cdots & z_{1n} \\ z_{21} & z_{22} \cdots & z_{2n} \\ \cdot & \cdot & \cdot \\ \cdot & \cdot & \cdot \\ \cdot & \cdot & \cdot \\ z_{n1} & z_{n2} \cdots & z_{nn} \end{bmatrix}=\begin{bmatrix} \bar{z}_{11} & \bar{z}_{12} \cdots & \bar{z}_{1n} \\ \bar{z}_{21} & \bar{z}_{22} \cdots & \bar{z}_{2n} \\ \cdot & \cdot & \cdot \\ \cdot & \cdot & \cdot \\ \cdot & \cdot & \cdot \\ \bar{z}_{n1} & \bar{z}_{n2} \cdots & \bar{z}_{nn} \end{bmatrix} \quad (6)$$

(5) The reference port $r$ is realized by placing a tab with tab size $d$ at the quarter length of $l$ for the reason that $$z_{rr}=z_{ii\,min} \text{ (in squares)}\cdot\rho \text{ (in ohms per square)}$$

(6) Find the normalized $\bar{Z}_{ri}$, defined as $$\bar{Z}_{ri}=2(\bar{z}_{rr}-\bar{z}_{ri})$$

for $i=1, 2, \ldots r-1, r+1, \ldots n$. Since $\sigma=(z_{ir})_{min}$, the geometric $Z_{ii\,max}$ of the tapped $\overline{R}$ network with the ratio M and tab size $d$ should be equal to or greater than the normalized $(Z_{ri})_{max}$, i.e., $(\bar{Z}_{ri})_{max}$ where $$(\bar{Z}_{ri})_{max}=2(\bar{z}_{rr}-(\bar{z}_{ri})_{min})$$

This ensures that all of the $n$-ports can be realized by the network. Stated otherwise, it proves the existence of a solution.

Figure 4:
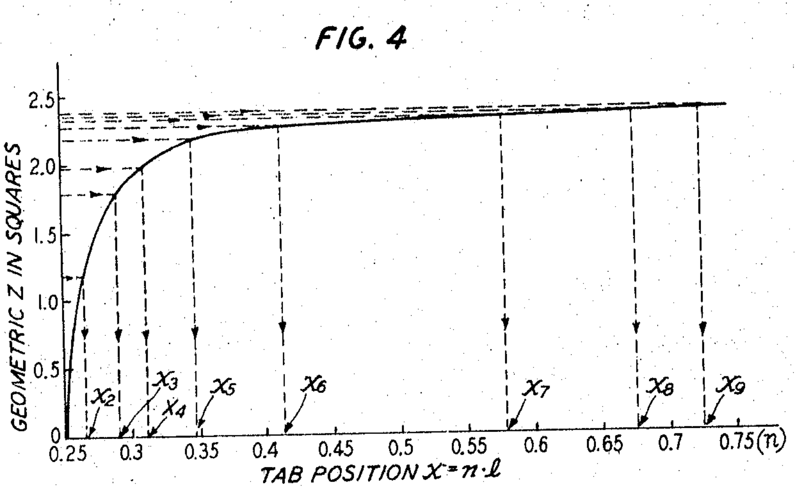
FIG. 4 is a plot of geometric impedance (in squares) vs. tab position for use in locating tab positions in a distributed resistance network that is functionally equivalent to the ladder network of FIG. 3.

(7) Determine the tab positions. Each tab position is determined by making $\bar{Z}_{ri}$ equal to the value calculated in the preceding step. The exact theoretical resistance between two tabs of a tapped $\overline{R}$ network which are not symmetrically placed with respect to the center can be determined by a rather complex calculation which is not disclosed herein. Such a determination may be effected more readily by employing a curve derived from plotting the resistance between variously placed tabs and a fixed reference tab vs. the placed tab position, with the network dimension ratio M and tab size $d$ fixed. An example of such a curve, which is obtained experimentally, is shown in FIG. 4. The employment of such a curve is described in detail hereinbelow.

(8) Determine the actual length $l_{act}$. After all the tab positions are determined, the shortest spacing between any two adjacent tabs may be determined. If this shortest spacing or minimum gap is expressed as $g_{min}=\lambda\cdot l$, where $\lambda$ is some small determinable fraction and S is the minimum allowable spacing between two electrodes, then:

$$\lambda\cdot l_{act} \geq S \text{ or } l_{act} \geq S/\lambda \quad (7)$$

Finally, $$l'_{act}=l_{act}/r \quad (8)$$

Figure 3:
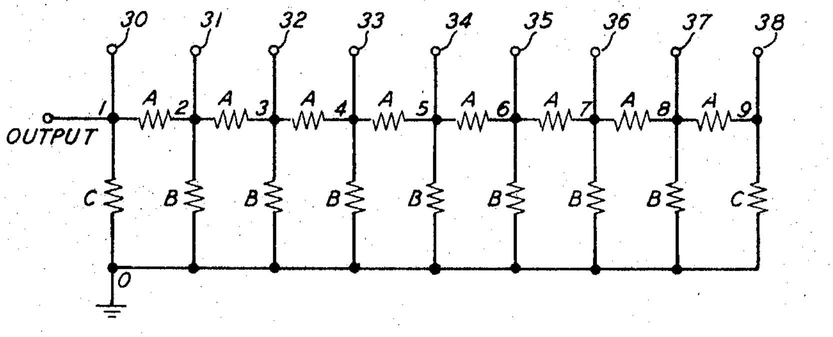
FIG. 3 is a lumped resistance ladder network of the type employed as the digital-to-analog translator for a PCM decoder.

A typical problem which may be solved in accordance with the principles of the invention is the problem of designing a tapped distributed $\overline{R}$ network that is the equivalent of the lumped resistance ladder network shown in FIG. 3, in the sense of FIG. 8. Ladder networks of the form shown in FIG. 3 may be employed in the receiver portion of a pulse code modulation system to effect decoding or digital-to-analog translation. A diode logic circuit is employed to translate each digit-representing combination of digital signals into a single output pulse of uniform amplitude which pulse is then applied to a respective one of the input terminals 30 through 38. The impedances at each of the nodes 1 through 9 are tailored to produce an output signal that is uniquely identified, in terms of amplitude, with the input node to which the corresponding input signal was applied. Illustrative resistance magnitudes in ohms for the resistors A, B and C are as follows:

A=112.5
B=227.56
C=113.14

Employing the resistance magnitudes indicated, the Z-matrix of the PCM decoder shown in FIG. 3 may be expressed as shown in FIG. 8. Port 1 in FIG. 3 is the reference port and X in FIG. 8 indicates arbitrary transfer functions.

In accordance with the principles of the invention, an equivalent area network may be constructed as follows: Assume a tab size of $.01l$. For a tapped $\overline{R}$ network with the ratio of $l/l'=12$, $z_{ii\,min}=1.1933$, $z_{ii\,max}=1.1932997$ and $Z_{ii\,max}=2.386389$. Employing the relation $$\sigma=z_{ii\,min}-(\tfrac{1}{2})Z_{ii\,max} \quad (9)$$

$$\sigma=0.00063 \quad (10)$$

If a material with a respective $$\rho=\frac{75.4}{z_{ii\,min.}}=63.184 \text{ ohms per square}$$

is used, $$(z_{ri})_{min.}=\frac{0.2845}{63.184}=0.0045>\sigma$$

Accordingly, a pratical network may be realized. The maximum error in the driving point function is $$\frac{z_{ii\,max}-z_{ii\,min}}{z_{ii\,min}}=0.000357$$

which may be considered negligible.

Figure 5:
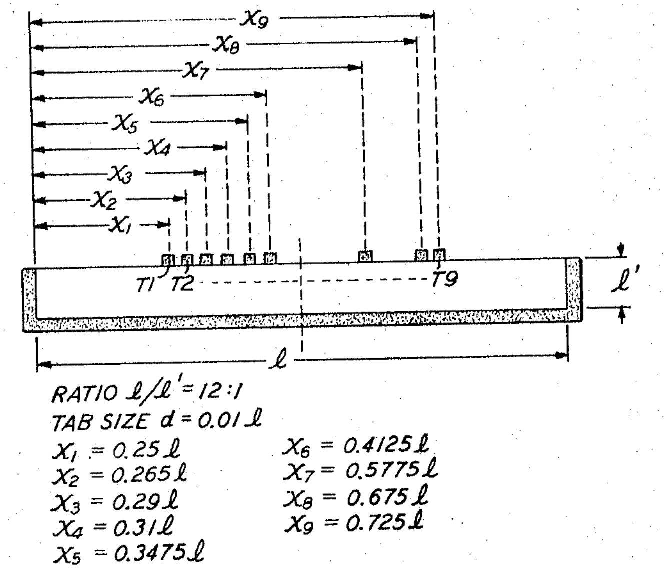
FIG. 5 is a network in accordance with the invention that is equivalent to the ladder network of FIG. 3.

The normalized Z-matrix, $[\overline{Z}]$, may be expressed as shown in FIG. 9. (Port 1 is the reference port $r$.) $\overline{Z}_{ir}$ is calculated to be:

$\overline{Z}_{21}=1.193$
$\overline{Z}_{31}=1.7895$
$\overline{Z}_{41}=1.988$
$\overline{Z}_{51}=2.18688$
$\overline{Z}_{61}=2.28644$
$\overline{Z}_{71}=2.33622$
$\overline{Z}_{81}=2.36110$
$\overline{Z}_{91}=2.373550$ The tab locations are determined as follows: The first tab T1 of the network shown in FIG. 5 is set at the position $0.25l$ which is the reference port. An experimental curve of the input impedance between a tab and the reference tab vs. the tab position is shown in FIG. 4. The location of tab T2 is determined by drawing a horizontal line at $Z=\overline{Z}_{21}$ intersecting the curve. The abscissa of the intersection, $x_2$, is the place where tab T2 should be located. The tab locations of tabs T3 through T9, corresponding to the distances $x_3 \ldots x_9$ are determined similarly. The tapped $\overline{R}$ network of FIG. 5 thus constructed in accordance with the invention is the functional equivalent of the lumped network shown in FIG. 3.

Although the invention has been disclosed thus far solely in terms of a distributed resistance thin film network having a rectangular configuration, the principles of the invention are equally applicable to certain networks that are substantially circular in form. Owing to their more compact configuration, circular networks afford certain manufacturing and packaging advantages as compared to rectangular networks. Insight as to the relation between rectangular and circular networks in the context of the invention may be gained from considering the networks of FIGS. 10A through 10D.

Figure 10A:
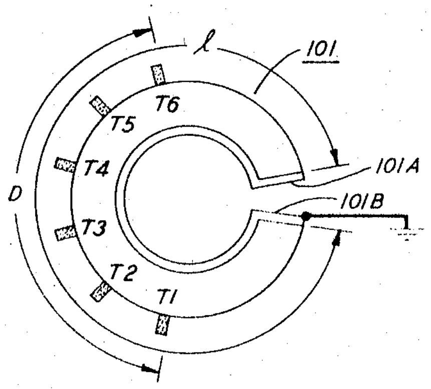
FIGS. 10A through 10D are sketches of circular type networks in accordance with the invention.

Network 101 of FIG. 10A may be considered as a modified form of the rectangular network of FIG. 5 with the end portions 101A and 101B bent around to form a partial annular ring. The tabs T1 through T6 are placed throughout the length of the arc D in accordance with the specific functional network requirements. The distance D is still one half of the total arc. $l$. Disregarding the particular spacing between the tabs, the network of FIG. 10A is substantially identical from an electrical standpoint to the network of FIG. 5.

Figure 10B:
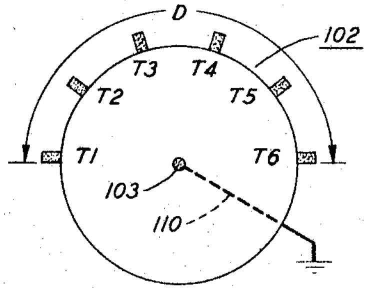

The network 101 of FIG. 10A may be simplified as shown by the network 102 of FIG. 10B by concentrating the ground plane in a single small conductive spot 103 in the center of a circular area of resistive film. Tabs T1 through T6 are placed within the arc D which is one half the circumference of the disc. A conductor 110 must be provided to connect the conductive spot 103 to ground. In some circuit arrangements such a connection may be undesirable and may require drilling through the substrate. In the case of the network 102, the ratio of "length-to-width," or more accurately the equivalent thereof, is approximately $2\pi$. This ratio may readily be increased by expanding the size of the conductive spot 103. The relative impedance between each of the tabs T1 through T6 and ground is unaffected, however, by the size of the conductive spot 103.

Figure 10C:
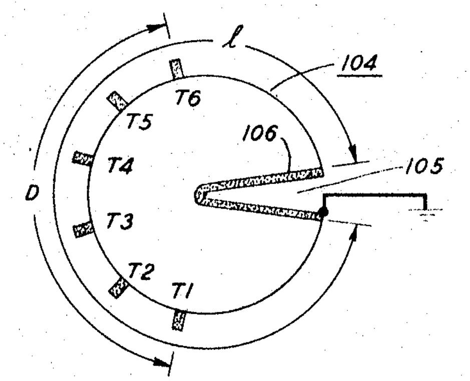

The advantages of a circular embodiment may be attained and connection to ground simplified by the network 104 shown in FIG. 10C where a small sector 105 has been cut out and a conductive strip 106 affixed to its radial boundaries. The tabs T1 through T6 are placed in the arc D which is one half of the length of the arc $l$.

Figure 10D:
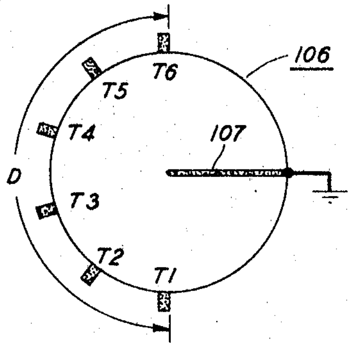

If the sector 105 is eliminated, a network 106 as shown in FIG. 10D results. Because of the position of the conductive ground strip 106, the tabs T1 through T6 should theoretically be restricted to an arc D that is slightly less than one half of the total circumference of the disc. From a practical standpoint, however, the arc D may be taken as one half of the total circumference.

The discussion, analysis and synthesis dealing with tab sizes and various impedance considerations set forth above with respect to rectangular networks is equally applicable to the circular type of networks shown in FIGS. 10A through 10D. The choice of which network form to employ in a particular case will generally be dictated by the circuit or network environment.

It is to be understood that the embodiments described herein are merely illustrative of the principles of the invention and that various modifications thereto may be effected by persons skilled in the art without departing from the spirit and scope of the invention.

What is claimed is:

1. An $n$-port, monolithic, thin film, distributed resistance network comprising a substrate with a resistive film thereon covering a substantially rectangular area having a relatively high length to width ratio, means for maintaining one side and both ends of said area at a common reference potential, and a plurality of $n$ conductive terminal tabs affixed to the other side of said area, all of said tabs being affixed within a space defined by the center one-half of said other side, whereby the impedance between each of said tabs and said reference potential maintaining means is substantially identical.

2. Apparatus in accordance with claim 1 wherein each of two of said tabs is positioned at a respective one of the end boundaries of said space.

3. Apparatus in accordance with claim 1 wherein each of said tabs has a common width within the range $0.01l$ to $0.001l$, where $l$ is the length of said area.

4. Apparatus in accordance with claim 1 wherein the length to width ratio of said area is not less than 5.

5. An $n$-port, monolithic, thin film distributed resistance network comprising a substrate with a resistive film deposited thereon covering a substantially rectangular area having a relatively high length to width ratio, means for maintaining one side and at least a substantial portion of both ends of said area at a common reference potential, and a plurality of $n$ conductive terminal tabs affixed to the other side of said area, all of said tabs being affixed within a space defined by the center one-half of said other side, the spacing between adjacent ones of said tabs being adjusted so that the impedance relation among said tabs is substantially identical to the impedance relations among the ports of a multiport lumped resistance ladder network, the impedance between each of said tabs and said reference potential maintaining means being substantially identical.

6. Apparatus in accordance with claim 5 wherein each of two of said tabs is positioned at a respective one of the end boundaries of said space.

7. Apparatus in accordance with claim 5 wherein said reference potential maintaining means includes a highly conductive film in contact with said one side and both ends of said area.

8. Apparatus in accordance with claim 5 wherein each of said tabs has a common width within the range $0.01l$ to $0.001l$, where $l$ is the length of said area.

9. Apparatus in accordance with claim 5 wherein the length to width ratio of said area is not greater than 12 and not less than 5.

10. Apparatus in accordance with claim 5 wherein said reference potential maintaining means comprises a film of highly conductive material in contact with one side and both ends of said area and means connecting said last named film to ground potential.

11. An $n$-port, monolithic, thin film, distributed resistance network comprising a substrate wafer with a resistive film thereon, means for maintaining a first preselected boundary portion of said resistive film at a reference potential, a plurality of $n$ conductive tabs affixed to said resistive film along a second preselected boundary portion, the length of said second boundary portion being equal to one half of the total boundary of said resistive film exclusive of said first boundary portion, each of said tabs being located at a common fixed distance from a respective portion of said reference potential maintaining means, whereby the impedance between each of said tabs and said reference potential maintaining means is constant.

12. Apparatus in accordance with claim 11 wherein said resistive film is of a rectangular configuration, said first preselected boundary including one side and both ends of said rectangular configuration, and said second preselected boundary portion including only the center one half of the other side of said rectangular configuration, each of two of said tabs being positioned at a respective end of said second boundary portion, and each of said tabs having a common width within the range of .01*l* to .001*l* where *l* is the length of one of said sides.

13. Apparatus in accordance with claim 11 wherein said resistive film is of a substantially circular configuration, said maintaining means comprising a conductive member being positioned substantially in the center of said circular configuration and means connecting said conductive member to a reference potential, said first preselected boundary coinciding with the boundary of said conductive member, said second preselected boundary portion comprising one half of the circumference of said circular configuration.

14. Apparatus in accordance with claim 11 wherein said resistive film is of a substantially circular configuration excluding a relatively small vacant sector portion, said maintaining means comprising a conductive member bounding the radial portions of said vacant sector portion and means connecting said conductive member to said reference potential, said first preselected boundary coinciding with the boundary of said conductive member, said second preselected boundary portion comprising one half of the circumference of said circular configuration less the arc of said sector portion.

15. Apparatus in accordance with claim 11 wherein said resistive film is of a substantially circular configuration, said maintaining means comprising a relatively narrow conductive strip from the center of said resistive film to a point on the circumference thereof and means connecting said conductive member to said reference potential, said first preselected boundary coinciding with the boundary of said strip, said second preselected boundary portion comprising the perimeter of that half of said circular configuration that does not include said strip, each of two of said tabs being positioned at a respective one of the terminals of said perimeter, and each of said tabs having a common width within the range of .01C to .001C where C equals the circumference of said circular configuration.

References Cited

UNITED STATES PATENTS

| | | | |
|---|---|---|---|
| 2,680,177 | 6/1954 | Rosenthal | 338—89 |
| 3,097,336 | 7/1963 | Sziklai et al. | 323—94 |
| 3,258,723 | 6/1966 | Osafune et al. | 333—70 |
| 3,380,156 | 4/1968 | Lood et al. | 338—308 |
| 3,405,382 | 10/1968 | Wright | 338—309 X |

JOHN F. COUCH, Primary Examiner

G. GOLDBERG, Assistant Examiner

U.S. Cl. X.R.

323—94; 338—309